(12) United States Patent
Zhu et al.

(10) Patent No.: US 9,664,836 B2
(45) Date of Patent: May 30, 2017

(54) ILLUMINATION SYSTEM

(71) Applicants: Tsinghua University, Beijing (CN); HON HAI PRECISION INDUSTRY CO., LTD., New Taipei (TW)

(72) Inventors: Jun Zhu, Beijing (CN); Xuan Pan, Beijing (CN); Guo-Fan Jin, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 384 days.

(21) Appl. No.: 14/539,018

(22) Filed: Nov. 12, 2014

(65) Prior Publication Data

US 2015/0131258 A1 May 14, 2015

(30) Foreign Application Priority Data

Nov. 14, 2013 (CN) .......................... 2013 1 0564545

(51) Int. Cl.
*G02B 9/12* (2006.01)
*F21V 8/00* (2006.01)
*G02B 27/09* (2006.01)

(52) U.S. Cl.
CPC ....... *G02B 6/0005* (2013.01); *G02B 27/0927* (2013.01); *G02B 27/0994* (2013.01)

(58) Field of Classification Search
CPC ...... G02B 6/00; G02B 6/0005; G02B 6/0001; G02B 27/0994; G02B 27/0927
See application file for complete search history.

(56) References Cited

U.S. PATENT DOCUMENTS

2009/0016061 A1* 1/2009 Chen .................. G02B 27/0994
                                                        362/284
2016/0091784 A1    3/2016 Hu et al.

FOREIGN PATENT DOCUMENTS

| CN | 201636772 | 11/2010 |
| CN | 103279005 | 9/2013 |
| TW | 200903138 | 1/2009 |

* cited by examiner

*Primary Examiner* — Joseph P Martinez
(74) *Attorney, Agent, or Firm* — Steven Reiss

(57) ABSTRACT

An illumination system defined a primary optical axis is provided. The illumination system comprises a light source, a first lens group, an integrator rod, and a second lens group successively located on the primary optical axis. The light source is configured to output a light. The first lens group is configured to reduce an aperture angle of the light to about 27 degrees. The integrator rod is configured to make the light uniformly. The second lens group is configured to amplify an illumination field of the light and reduce the aperture angle of the light to about 3 degrees.

19 Claims, 3 Drawing Sheets

ILLUMINATION SYSTEM

CROSS-REFERENCE TO RELATED APPLICATIONS

This application claims all benefits accruing under 35 U.S.C. §119 from China Patent Application No. 201310564545.0, filed on Nov. 14, 2013 in the China Intellectual Property Office, disclosure of which is incorporated herein by reference.

BACKGROUND

1. Technical Field

The present disclosure relates to an illumination system, especially an illumination system having high uniformity of illumination.

2. Description of Related Art

Nowadays, a conventional illumination system often uses a number of micro-lens arrays to achieve uniform illumination. However, the micro-lens arrays are formed by a standard micro-lithographic technology, which is complex and highly cost. Furthermore, the conventional illumination system comprising the micro-lens arrays usually has a large volume and a complex structure, which makes it hard to apply in small image systems.

What is needed, therefore, is to provide an illumination system, in which the illumination system can provide a superior uniformity of illumination, and have simple structure and low cost.

BRIEF DESCRIPTION OF THE DRAWINGS

Many aspects of the embodiments can be better understood with reference to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

References will now be made to the drawings to describe, in detail, various embodiments of the illumination system.

Figure 1:
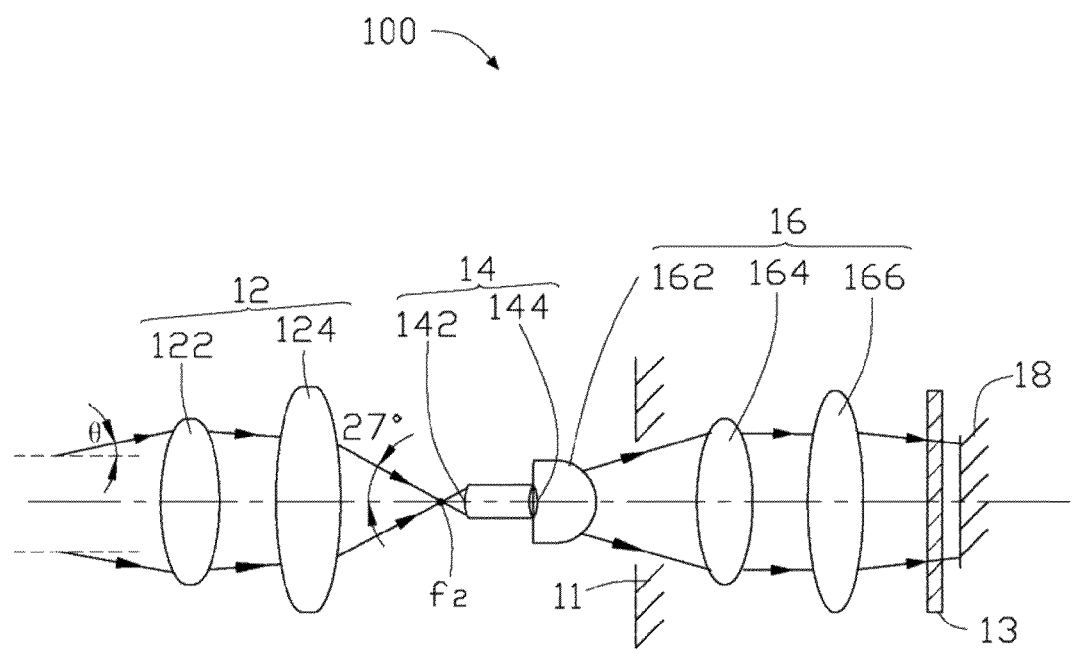
FIG. 1 shows a schematic structural view of one embodiment of an illumination system.

Referring to FIG. 1, an illumination system 100 of one embodiment comprises: a light source (not shown), a first lens group 12, an integrator rod 14, and a second lens group 16. The illumination system 100 defines a primary optical axis, and the light source, the first lens group 12, the integrator rod 14, and the second lens group 16 are located on the primary optical axis.

The light source outputs a parallel light or a light with a divergent angle θ ranged from +10 degrees and −10 degrees. A diameter of the light can be selected by a diameter of the first lens group 12. In one embodiment, the light source outputs a light with a divergent angle θ of about ±5 degrees and a diameter of about 25 millimeters.

The first lens group 12 is located on a light path of the light and reduces an aperture angle of the light. A distance between the light source and the first lens group 12 is not limited, it is just required that light can enter into the first lens group 12. The first lens group 12 comprises a first convex lens 122 and a second convex lens 124 located on the primary optical axis. The second convex lens 124 is located on a side of the first convex lens 122 away from the light source. A focus $f_2$ of the second convex lens 124 is defined on a side of the second convex lens 124 opposite to the first convex lens 122. Materials and dimensions of the first convex lens 122 and the second convex lens 124 and a distance between the first convex lens 122 and the second convex lens 124 are not limited, as long as the aperture angle of the light can be reduced to about 27 degrees. In one embodiment, a material of the first convex lens 122 is BK7 glass, a curvature radius of a first surface of the first convex lens 122 adjacent to the light source is about 35 millimeters, a curvature radius of a second surface of the first convex lens 122 adjacent to second convex lens 124 is about 158 millimeters, and a thickness of the first convex lens 122 is about 7 millimeters. A material of the second convex lens 124 is ZF2 glass, a curvature radius of a first surface of the second convex lens 124 adjacent to the first convex lens 122 is about 15.65 millimeters, a curvature radius of a second surface of the second convex lens 124 adjacent to the integrator rod 14 is about 29.5 millimeters, and a thickness of the second convex lens 124 is about 5 millimeters; a distance between the first convex lens 122 and the second convex lens 124 is about 2 millimeters.

The integrator rod 14 is located on a side of the second convex lens 124 away from the first convex lens 122 and parallel to the primary optical axis. The integrator rod 14 is capable of making the light uniformly. A cross section of the integrator rod 14 perpendicular to a length direction of the primary optical axis can be rectangle, square, round or other geometric shapes. In one embodiment, the cross section of the integrator rod 14 is a square with an inner size of about 8 millimeters by 8 millimeters and an outer size of about 9 millimeters by 9 millimeters, and an inner surface of the integrator rod 14 is plated with aluminum. The integrator rod 14 comprises an entrance 142 and an outlet 144 opposite to the entrance 142. The entrance 142 can be located on the primary optical axis adjacent to the focus $f_2$. In some embodiments, the entrance 142 is located on a side of the focus $f_2$ away from the second convex lens 124, and a distance between the entrance 142 and the focus $f_2$ ranges from about 0 millimeters to about 8 millimeters. In other embodiments, the distance between the entrance 142 and the focus $f_2$ ranges from about 5 millimeters to about 8 millimeters, thus, a more uniform light can be achieved. In one embodiment, the distance between the entrance 142 and the focus $f_2$ is about 7 millimeters.

The second lens group 16 is located on a side of the integrator rod 14 away from the first lens group 12. The second lens group 16 amplifies an illumination field of the light and further reduces the aperture angle of the light. In one embodiment, the aperture angle of the light is reduced to about 3 degrees by the second lens group 16.

The second lens group 16 comprises a third convex lens 162, a fourth convex lens 164 and a fifth convex lens 166. The third convex lens 162, the fourth convex lens 164 and the fifth convex lens 166 are successively located on the primary optical axis along a direction away from the integrator rod 14.

In one embodiment, a material of the third convex lens 162 is H-ZK7 glass. A curvature radius of a first surface of the third convex lens 162 adjacent to the integrator rod 14 is about 28.84 millimeters. A curvature radius of a second surface of the third convex lens 162 away from the integrator rod 14 is about 12.27 millimeters. A thickness of the third convex lens 162 is about 15.00 millimeters, and the first surface of the third convex lens 162 is attached to the outlet 144 of the integrator rod 14. A material of the fourth convex lens 164 is H-K9L glass. A curvature radius of a first surface of the third convex lens 162 adjacent to the fourth convex lens 164 is about 38.46 millimeters. A curvature radius of a second surface of the fourth convex lens 164 away from the third convex lens 162 is about 28.16 millimeters. A thickness of the fourth convex lens 164 is about 10.00 millimeters, and a distance between the fourth convex lens 164 and the third convex lens 162 is about 0.1 millimeters. A material of the fifth convex lens 166 is ZF2 glass. A curvature radius of a first surface of the fifth convex lens 166 adjacent to the fourth convex lens 164 is about 92.2 millimeters. A curvature radius of a second surface of the fifth convex lens 166 away from the fourth convex lens 164 is about 66.44 millimeters. A thickness of the fifth convex lens 166 is about 5 millimeters, and a distance between the fourth convex lens 164 and the fifth convex lens 166 is about 50 millimeters.

The second lens group 16 can further comprises a stop 11 located between the fourth convex lens 164 and the third convex lens 162. The stop 11 can block excess light, and then improve the illumination field of the light. In one embodiment, a diameter of the stop 11 is about 24.4 millimeters.

The illumination system 100 can further comprises a receiver 18 located on a side of the second lens group 16 away from the integrator rod 14. The receiver 18 can be a plane perpendicular to the primary optical axis. The receiver 18 receives the final light.

Furthermore, the illumination system 100 can further comprise a polarizer 13 to justify a light intensity of the illumination system 100. The polarizer 13 can be located on any location of the primary optical axis. In one embodiment, the polarizer 13 is located between the receiver 18 and the second lens group 16.

Figure 2:
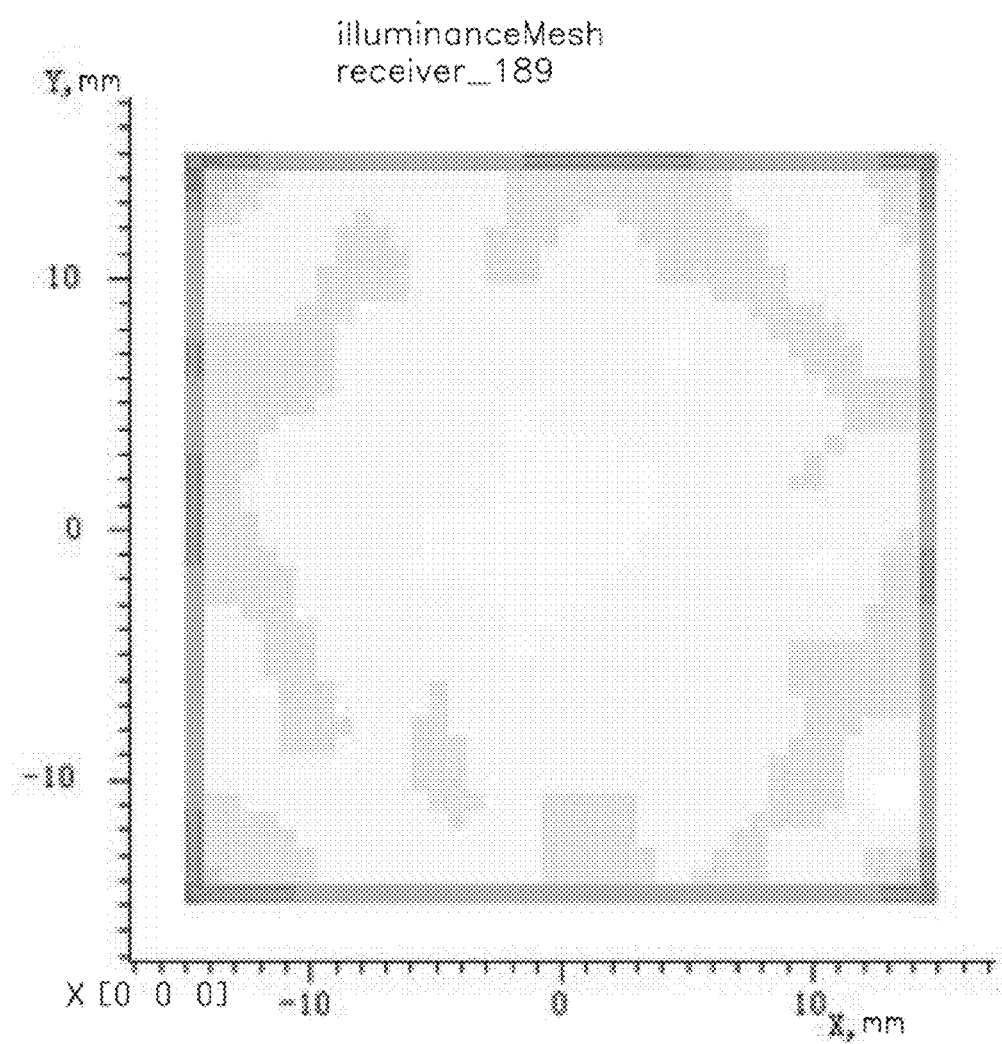
FIG. 2 is a square light spot obtained by simulation of the illumination system of FIG. 1.
Figure 3:
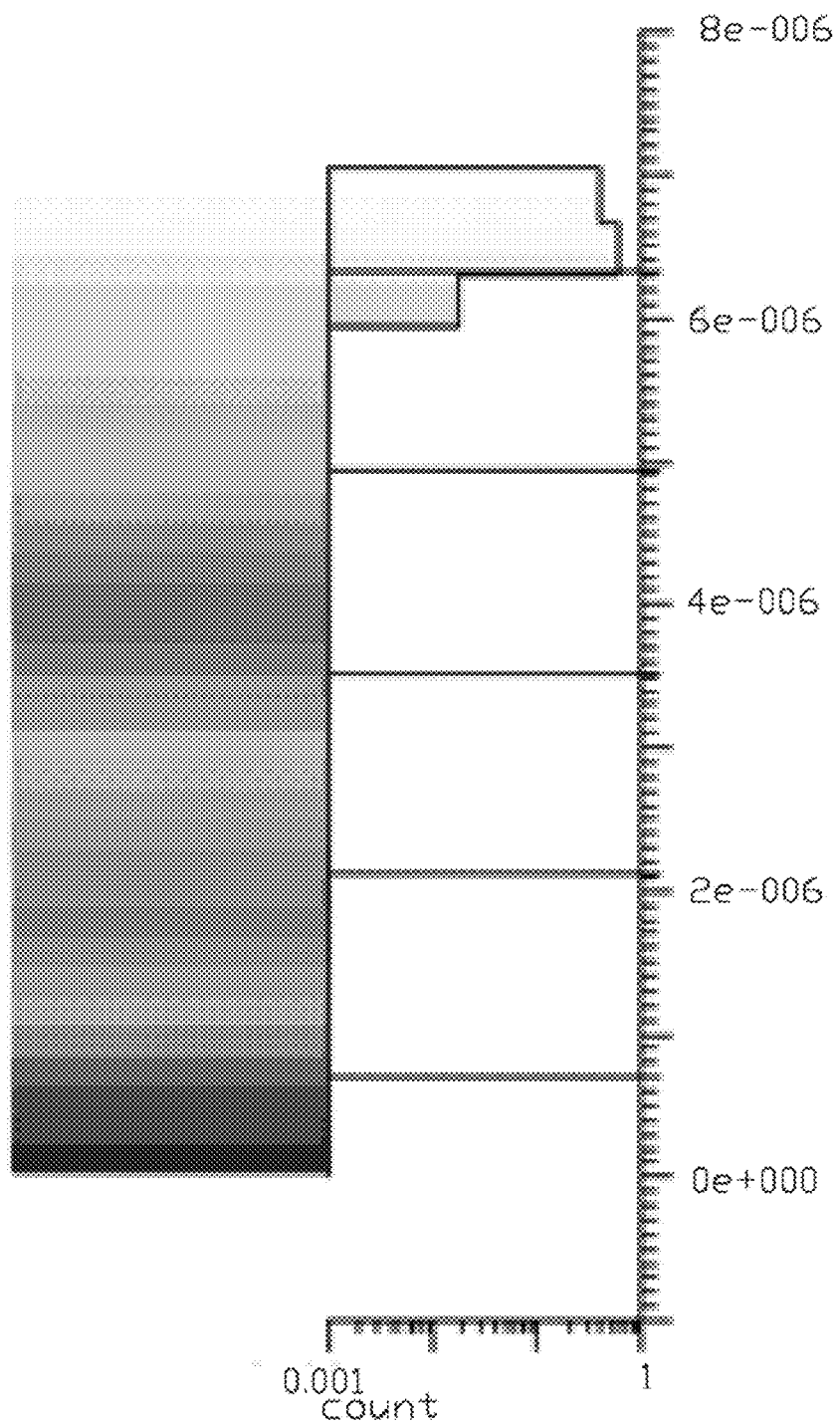
FIG. 3 is an illuminance distribution of the square light spot of FIG. 2 obtained by simulation of the illumination system.

Referring to FIGS. 2 and 3, FIG. 2 is a square light spot with a size of 30 millimeters×30 millimeters obtained by simulation of the illumination system 100.

FIG. 3 is an illumination distribution of the square light spot obtained by simulation of the illumination system 100 of FIG. 2. As can be seen from the figures, the illumination system 100 has a superior uniformity of illumination distribution in the whole area of the square light spot. Furthermore, the illumination system 100 of the present embodiment has simple structure and low cost.

It is to be understood that the above-described embodiments are intended to illustrate rather than limit the disclosure. Any elements described in accordance with any embodiments is understood that they can be used in addition or substituted in other embodiments. Embodiments can also be used together. Variations may be made to the embodiments without departing from the spirit of the disclosure. The above-described embodiments illustrate the scope of the disclosure but do not restrict the scope of the disclosure.

What is claimed is:

1. An illumination system, defined a primary optical axis, comprising:

a light source, a first lens group, an integrator rod, and a second lens group located on the primary optical axis; wherein the light source configured to output a light with a divergent angle ranged from +10 degrees and −10 degrees; the first lens group is located on a light path of the light and configured to reduce an aperture angle of the light to about 27 degrees; the integrator rod is located on a side of the first lens group away from the light source and parallel to the primary optical axis; and the second lens group is located on a side of the integrator rod away from the first lens group, and the second lens group configured to amplify an illumination field of the light and reduce the aperture angle of the light to about 3 degrees.

2. The illumination system of claim 1, wherein the first lens group comprises a first convex lens and a second convex lens that are both located on the primary optical axis, and the second convex lens is located on a side of the first convex lens away from the light source.

3. The illumination system of claim 2, wherein a material of the first convex lens is BK7 glass, the first convex lens comprises a first surface and a second surface opposite to the first surface, the first surface is adjacent to the light source, a first surface curvature radius is about 35 millimeters, a second surface curvature radius is about 158 millimeters, and a thickness of the first convex lens is about 7 millimeters.

4. The illumination system of claim 2, wherein a material of the second convex lens is ZF2 glass, the second convex lens comprises a first surface and a second surface opposite to the first surface, the first surface is adjacent to the first convex lens, a first surface curvature radius is about 15.65 millimeters, a second surface curvature radius is about 29.5 millimeters, and a thickness of the second convex lens is about 5 millimeters.

5. The illumination system of claim 2, wherein a distance between the first convex lens and the second convex lens is about 2 millimeters.

6. The illumination system of claim 1, wherein a cross section of the integrator rod perpendicular to a length direction of the primary optical axis is rectangle, square or round.

7. The illumination system of claim 2, wherein a focus of the second convex lens is defined on a side of the second convex lens opposite to the first convex lens.

8. The illumination system of claim 7, wherein the integrator rod comprises an entrance and an outlet opposite to the entrance, and the entrance is located on a side of the focus away from the second convex lens.

9. The illumination system of claim 8, wherein a distance between the entrance and the focus ranges from about 0 millimeters to about 8 millimeters.

10. The illumination system of claim 8, wherein the distance between the entrance and the focus ranges from about 5 millimeters to about 8 millimeters.

11. The illumination system of claim 8, wherein the distance between the entrance and the focus is about 7 millimeters.

12. The illumination system of claim 8, wherein the second lens group comprises a third convex lens, a fourth convex lens and a fifth convex lens successively located on the primary optical axis along a direction away from the integrator rod.

13. The illumination system of claim 12, wherein a material of the third convex lens is H-ZK7 glass, the third convex lens comprises a first surface and a second surface opposite to the first surface, the first surface is adjacent to the integrator rod, a first surface curvature radius is about 28.84 millimeters, a second surface curvature radius is about 12.27 millimeters, a thickness of the third convex lens is about 15.00 millimeters, and the first surface of the third convex lens is attached to the outlet of the integrator rod.

14. The illumination system of claim 12, wherein a material of the fourth convex lens is H-K9L glass, the fourth convex lens comprises a first surface and a second surface opposite to the first surface, the first surface is adjacent to the third convex lens, a first surface curvature radius is about 38.46 millimeters, a second surface curvature radius is about 28.16 millimeters, a thickness of the fourth convex lens is about 10.00 millimeters, and a distance between the fourth convex lens and the third convex lens is about 0.1 millimeters.

15. The illumination system of claim 12, wherein a material of the fifth convex lens is ZF2 glass, the fifth convex lens comprises a first surface and a second surface opposite to the first surface, the first surface is adjacent to the fourth convex lens, a first surface curvature radius is about 92.2 millimeters, a second surface curvature radius is about 66.44 millimeters, a thickness of the fifth convex lens is about 5 millimeters, and a distance between the fourth convex lens and the fifth convex lens is about 50 millimeters.

16. The illumination system of claim 12, wherein the second lens group further comprises a stop located between the fourth convex lens and the third convex lens.

17. The illumination system of claim 1, further comprising a receiver located on a side of the second lens group away from the integrator rod, wherein the receiver is a plane perpendicular to the primary optical axis.

18. The illumination system of claim 17, further comprising a polarizer located on the primary optical axis.

19. The illumination system of claim 18, wherein the polarizer is located between the receiver and the second lens group.

* * * * *